(12) United States Patent
Kelly et al.

(10) Patent No.: US 7,264,660 B2
(45) Date of Patent: Sep. 4, 2007

(54) APPARATUS FOR DRYING A GAS

(75) Inventors: Anthony Kelly, Spennymoor (GB); Stephen Bittle, Darras Hall (GB)

(73) Assignee: Domnick Hunter Limited, Durham (GB)

( * ) Notice: Subject to any disclaimer, the term of this patent is extended or adjusted under 35 U.S.C. 154(b) by 460 days.

(21) Appl. No.: 10/498,165

(22) PCT Filed: Dec. 9, 2002

(86) PCT No.: PCT/GB02/05566

§ 371 (c)(1),
(2), (4) Date: Nov. 26, 2004

(87) PCT Pub. No.: WO03/053549

PCT Pub. Date: Jul. 3, 2003

(65) Prior Publication Data

US 2005/0103197 A1    May 19, 2005

(30) Foreign Application Priority Data

Dec. 10, 2001 (GB) ................................. 0129470.1

(51) Int. Cl.
  *B01D 53/04* (2006.01)
  *B01D 53/26* (2006.01)

(52) U.S. Cl. ............................. 96/139; 96/152; 55/452; 55/DIG. 17

(58) Field of Classification Search .................. 96/108, 96/134, 138, 139, 147, 151, 152; 55/392–399, 55/447, 452, 456, DIG. 17
See application file for complete search history.

(56) References Cited

U.S. PATENT DOCUMENTS

| | | | |
|---|---|---|---|
| 2,961,064 A * | 11/1960 | Fisher .......................... | 55/457 |
| 3,464,186 A | 9/1969 | Hankison et al. | |
| 4,361,425 A | 11/1982 | Hata | |
| 4,838,901 A * | 6/1989 | Schmidt et al. ................ | 95/90 |
| 4,925,466 A * | 5/1990 | Overby ........................ | 55/319 |
| 5,385,592 A * | 1/1995 | Maeda ........................ | 55/323 |
| 5,667,566 A | 9/1997 | Flynn et al. | |
| 6,139,609 A | 10/2000 | Eimer et al. | |

FOREIGN PATENT DOCUMENTS

RU    1725990 A1    12/1995

OTHER PUBLICATIONS

WPI Abstract Accession No. 1993-098873 [12] Apr. 15, 1992.

* cited by examiner

*Primary Examiner*—Frank M. Lawrence
(74) *Attorney, Agent, or Firm*—Maginot, Moore & Beck

(57) ABSTRACT

Apparatus for drying a gas comprises an elongate housing having an inlet port and an outlet port for the gas. The housing comprises at least two axially separable parts which can be separated to allow access to the interior of the housing. A cartridge contains an adsorbent material through which gas can flow axially from an inlet end which is in fluid communication with the inlet port to the housing towards an outlet end which is in fluid communication with the outlet port from the housing. The cartridge has a plurality of flexible vanes at the inlet end which, when the cartridge is located within the housing, are twisted so that gas flowing over the vanes has a circumferential flow imparted to it around the axis of the cartridge.

11 Claims, 1 Drawing Sheet

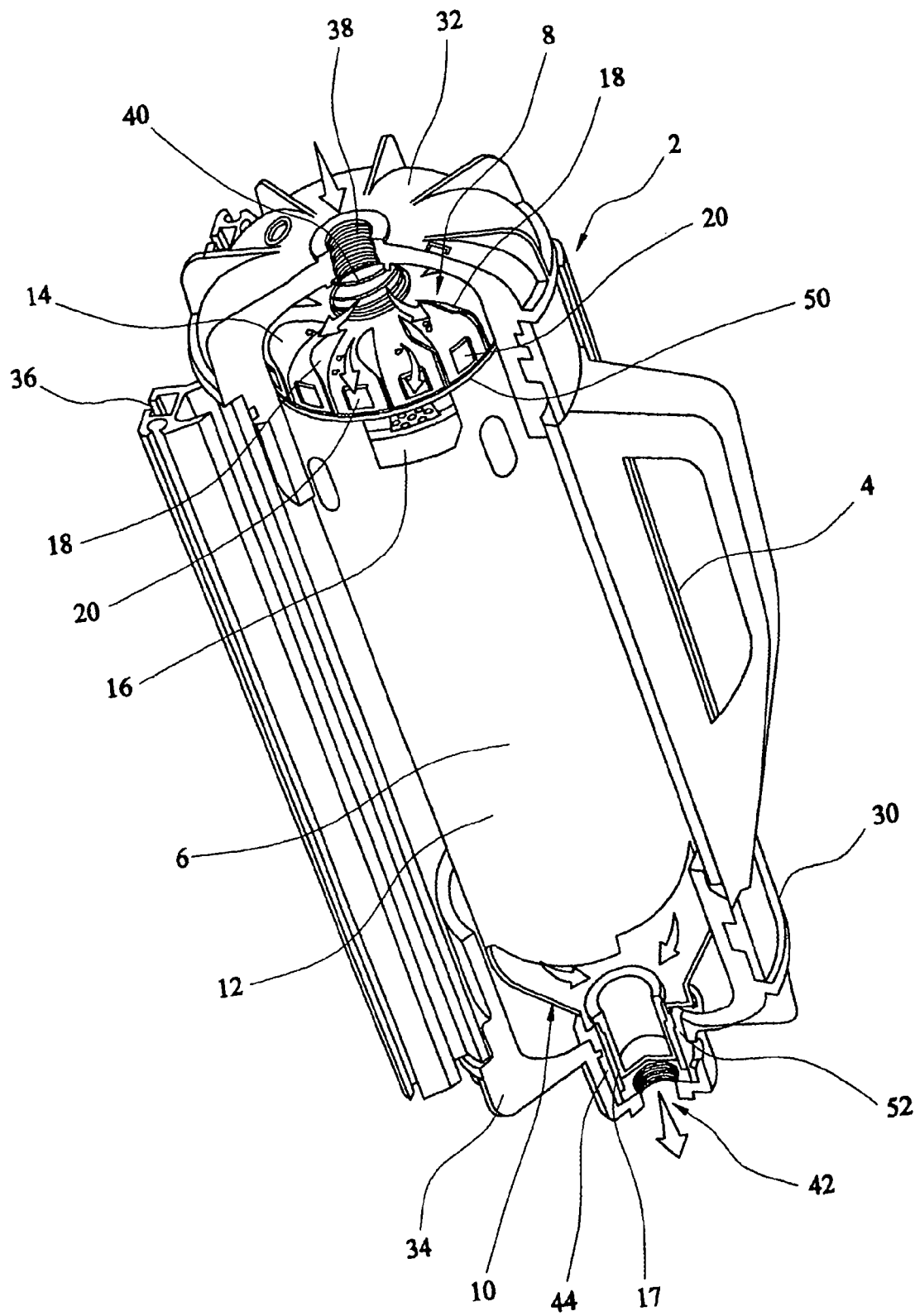

APPARATUS FOR DRYING A GAS

This application is a 371 of PCT Application No. PCT/GB02/05566, filed on Dec. 9, 2002.

FIELD OF THE INVENTION

This invention relates to apparatus for drying a gas.

BACKGROUND

A pressurised gas can be dried by passage over a quantity of an adsorbent material. It is known in industrial applications to place an adsorbent material such as a desiccant in relation to a flowing gas so that it is directed to flow over the desiccant in order to remove moisture from the gas. This can be achieved by placing adsorbent material in a housing which has an inlet for the gas and an outlet, with the housing connected to the pipework for the gas. Adsorbent material used in this way can be used to remove contaminants from the gas, which might be present in the form of liquid (including fine droplets in the form of an aerosol) as well as vapour which can condense on the surfaces of the adsorbent material.

A gas which has entrained in it significant quantities of liquid, for example in the form of fine droplets, can cause adsorbent material to become quickly saturated so that it is no longer capable of adsorbing liquid, for example liquid which is present in the gas in the form of vapour which then condenses on the adsorbent material. It is known to provide adsorbent material in modular cartridges which can facilitate replacement. However, the requirement to take the dryer components in a compressed gas system off line while a cartridge is replaced can be inconvenient and have undesirable effects on operating costs.

The present invention provides drying apparatus in which an adsorbent material cartridge is configured so as to encourage primary separation of liquid which is entrained in a gas stream by the provision of vanes which are twisted so as to impart circumferential flow to the gas which is to be dried as it enters the cartridge.

SUMMARY

Accordingly, in one aspect, the invention provides apparatus for drying a gas, which comprises an elongate housing having an inlet port and an outlet port for the gas, the housing comprising at least two axially separable parts which can be separated to allow access to the interior of the housing, and a cartridge containing an adsorbent material through which gas can flow axially from an inlet end which is in fluid communication with the inlet port to the housing towards an outlet end which is in fluid communication with the outlet port from the housing, the cartridge having a plurality of flexible vanes at the inlet end which, when the cartridge is located within the housing, are twisted so that gas flowing over the vanes has a circumferential flow imparted to it around the axis of the cartridge.

The apparatus of the invention has the advantage that the circumferential flow that is imparted to the gas as it enters the adsorbent material cartridge facilitates primary separation of liquid that is entrained in the gas stream. This liquid can be collected within the cartridge and does not therefore flow with the gas over the adsorbent material for adsorption. Consequently, the load on the adsorbent material within the cartridge is reduced, meaning that the lifetime of the cartridge is increased.

Preferably, the vanes contact the internal wall of the housing towards one end thereof when the housing is closed, causing the vanes to be deformed when the housing is closed so that they become twisted. Preferably, the vanes are made from a material which is resiliently deformable so that, after deformation of the vanes so that they have a helically twisted shape, the exert a force as they try to recover towards their untwisted shape. The vanes need not recover completely towards their untwisted shape prior to assembly of the apparatus housing. Preferably however they continue to exert some force as they try to recover; this can have the advantage that the cartridge is located positively within the housing, for example so that the adsorbent material cartridge is held in sealing engagement within the housing.

Preferably, the vanes are constructed so as to encourage controlled deformation towards their twisted configuration as the housing is closed. The construction of the vanes will depend on the desired twisted configuration and also the way in which the housing is closed. For example, the vanes can have a line of weakness provided in them which encourages the vanes to fold at a particular point when compressed. In another arrangement, the vanes can be constructed so that they are partially twisted prior to closing the housing. In this way, the effect of closing the housing will be to increased the extent of the twist by imparting a deformation to the vanes. This can be appropriate to control the direction of the twisted deformation (clockwise or anti-clockwise) that is imparted to the vanes, especially for example when closing the housing does not involve relative rotation between axially separable parts of the housing. This might also apply for example to a housing in which separable parts are closed by means of a bayonet closure, when the deformation of the vanes takes place when the parts are moved axially together, before any relative rotation.

Preferably, the adsorbent material cartridge has at least 4 vanes, more preferably at least 6 vanes, for example at least about 8 vanes. Preferably, the vanes are arranged at their roots on the cartridge so that they extend approximately radially outwardly from the centre of the cartridge.

Preferably, the effective height of the vanes is reduced as a result of the deformation by at least about 5%, more preferably at least about 10%.

Preferably, the vanes are provided as a part of an end cap on the adsorbent material cartridge. The cartridge can then comprise a canister for the adsorbent material. The cartridge canister can be closed at one end and formed as such by moulding. Otherwise, it can have a constant cross-section (such as would result from it being formed by extrusion) and be closed at each end by means of an end cap. It can be preferred for the vanes to be provided as a part of an end cap on the adsorbent material cartridge because it allows the cartridge canister and the end cap to be made from different materials or by different processes (extrusion, moulding etc).

Preferably, the end cap of the adsorbent material cartridge is formed from a resiliently deformable material such as a polymeric material. Examples of suitable materials include polyolefins (especially polyethylenes and polypropylenes), certain polyamides and polyesters. Other polymers can be suitable for other applications. Polymers will be selected according to the physical characteristics required of the end cap, and with a view to eliminating unwanted chemical interactions between the material of the end cap and materials with which the end cap will come into contact when the apparatus is in use.

Preferably, the cartridge and the housing are arranged so that the cartridge has to be twisted relative to the housing when the inlet end of the cartridge is fitted into the housing.

Twisting the cartridge relative to the housing has the advantage that it can lead to appropriate deformation of the vanes on the cartridge end cap to impart a helical or twisted shape to them. The deformation can then result from frictional engagement between the vanes and the internal wall of the housing. In particular, twisting the cartridge relative to the housing can ensure that all of the vanes are deformed in the same sense (clockwise or anti clockwise).

Preferably, the length of the adsorbent material cartridge measured between the points on the opposite ends at which it engages the internal end walls of the housing, prior to deformation of the vanes, is greater between the distance between the said engagement points on the end walls of the housing. In this way, closing of the housing will result in the vanes being deformed due to engagement with the end wall of the housing.

It can be preferred for the internal wall of the housing to have a concave, generally rounded shape at the inlet end. The vanes on the desiccant cartridge can then have a shape which is less rounded so that the edges of the vanes engage the internal wall of the housing when the cartridge is inserted.

Preferably, the axially separable parts of the housing are connected to one another by rotating one part relative to the other part. For example, the parts might have mating threads by which they can be connected to one another. In another arrangement, the parts might have a bayonet closure arrangement, in which case, the resilient deformability of the vanes can provide resistance to unwanted separation of the housing parts.

Preferably, the axially separable parts of the housing can be separated from one another towards the end of the housing in which the inlet port is provided. The housing can then comprise, for example, a body part and an end cap. The end cap can be at the end of the housing which engages the inlet end of the cartridge. In this arrangement, the cartridge can be located within the body part of the housing. The inlet end of the cartridge will then protrude from the body part of the housing. The housing can then be closed by mating the body part and the end cap. When they body part and the end cap are closed by relative rotation (especially by means of cooperating threads), frictional effects between the internal wall of the end cap and the vanes can be relied on to deform the vanes so that they adopt a helical configuration.

It is particularly preferred that the housing comprise a body part and two separable end caps. Preferably, the inlet for the compressed gas is provided in one of the end caps, and the outlet for the compressed gas is provided in the other of the end caps. The body part of the housing can then have a constant cross-section (apart from features by which the cross-section is specifically modified for example to provide fixation points for other components of the apparatus or to provide seals to other components) along its length, such as might result from formation of the body section by extrusion.

Preferably, the adsorbent material cartridge has openings between the vanes through which gas can enter the cartridge. Preferably, the apparatus includes a seal between the outside of the cartridge and the internal wall of the housing, for minimizing flow of gas other than through the openings for gas to enter the cartridge.

Preferably, the apparatus includes a seal arrangement at the outlet end of the cartridge which ensures that gas leaving the cartridge does not leak into the space within the housing between the internal wall of the housing and the cartridge. For example, the cartridge can have a nozzle which is received in a bore in the housing, with appropriate an seal between the external surface of the nozzle and the internal surface of the bore. The seal might be provided for example by a compressible O-ring. Force exerted by the vanes on the housing as the vanes attempt to recover towards their undeformed configuration can help to locate the cartridge in the housing, with the nozzle within the bore at the outlet end of the cartridge, and with a compressible O-ring (when used for the seal) compressed between the cartridge and the housing. This can be further enhanced by a spring acting between the cartridge and the housing at the inlet end.

Materials for the housing will be selected according to factors such as the pressure to which the compressed gas system is exposed when in use, the materials (especially fluids and other contaminants flowing in the compressed gas) to which the apparatus will be exposed when in use, and so on. It will generally be preferred for the housing to be made from one or more metals. Aluminum and its alloys will be preferred for many applications because of the combination of high strength and low weight, and also its resistance to corrosion. The housing can conveniently be formed from metallic materials by processes which include extrusion (for example when the housing includes a body section with a constant cross-section) and casting.

The apparatus can be used to remove liquid and other contaminants from a compressed gas. The adsorbent material which is provided in the cartridge will be selected according to the nature of the materials to be removed from the gas. Frequently, it will be important to remove water from the gas. Other materials which can be removed by passing the gas through the cartridge include compressor oil and particulate materials. Suitable materials for loading a cartridge of this general type are well known. They include molecular sieve materials. The materials can be based on, for example, activated carbon or activated alumina.

BRIEF DESCRIPTION OF THE DRAWINGS

Embodiments of the present invention will now be described by way of example with reference to the accompanying drawings, which is an elevational view, partially cut away, of apparatus according to the present invention for drying a gas.

DETAILED DESCRIPTION OF THE PREFERRED EMBODIMENT

Referring to the drawing, apparatus 2 for drying a gas comprises a housing 4 and a cartridge 6. The cartridge 6 has an inlet end 8 and an outlet end 10. It comprises a body part 12 which is tapered towards the outlet end 10, and a closure cap 14 at the inlet end. The cartridge contains a granular molecular sieve material 16 within it of a kind that is known for desired adsorption properties. There is an outlet nozzle 17 at the outlet end of the cartridge.

The closure cap 14 has a plurality of lobe shaped vanes 18 arranged around its periphery, extending upwardly from the surface of the closure cap in the direction generally opposite to the direction of flow of gas from the inlet end of the cartridge to the outlet end. Openings 20 are provided between adjacent vanes for gas to flow into the cartridge.

The housing 4 comprises a body part 30, a top end cap 32 and a bottom end cap 34. The body part has a substantially constant cross-section and is formed from a length of an extrusion. It can be formed with a groove 36 extending along its length which can be used to mount the housing, or to receive a plaque bearing a name or other identifying markings. Grooves, threads or other formations can be provided at each end for the body part to be connected to the top and bottom end caps 33, 34.

The top and bottom end caps of the housing are formed by casting. The top end cap 32 has a central inlet port 38 through which gas is directed into the apparatus to flow through a cartridge 2. The inlet port is internally threaded for connection to pipework for the compressed gas. A spring 40 is provided adjacent to the inlet port.

The bottom end cap 34 of the housing has an outlet port 42. The outlet port is internally threaded for connection to pipework for the compressed gas. The bottom end cap has an enlarged bore 44 communicating with the outlet port for receiving the outlet nozzle 17 on the cartridge 6.

An inlet end seal 50 is provided between the cartridge and the housing downstream of the openings 18 in the cartridge. This ensures that gas flows into the cartridge instead of flowing into the space between the cartridge and the housing. An outlet end seal 52 is provided between the outlet nozzle 17 on the cartridge and the enlarged bore 44 on the bottom end cap 34.

The apparatus is assembled by first separating the top end cap 32 from the body part 30 of the housing. The adsorbent material cartridge 6 is then located within the housing with the outlet nozzle 17 in the enlarged bore 44 so that the outlet end seal 52 is compressed.

The top end cap 32 of the housing is then connected to the body part 30 by engaging the mating threads. This causes the spring 40 to be compressed between the closure cap 14 of the cartridge and the top end cap. The effective length of the housing, measured between the internal surfaces of the top and bottom end caps, reduces as the top end cap is screwed on to the housing. Frictional forces between the lobular vanes 18 and the inside surface of the top end cap results in the vanes being twisted. The deformation of the vanes is such that they attempt to recover to their pre-deformation configuration. The combination of the forces exerted by the vanes on the top end cap and the forces exerted by the spring between the closure cap on the cartridge and the top end cap of the housing ensure that the cartridge is located positively in the housing, with the outlet nozzle on the cartridge in the enlarged bore at the outlet end of the housing.

Experiments have shown that the use of fins which give rise to a circumferential flow in the gas entering the adsorbent material cartridge can increase cartridge lifetime by 10% or more.

The invention claimed is:

1. Apparatus for drying a gas, which comprises an elongate housing having an inlet port and an outlet port for the gas, the housing comprising at least two axially separable parts which can be separated to allow access to the interior of the housing, and a cartridge containing an adsorbent material through which gas can flow axially from an inlet end which is in fluid communication with the inlet port to the housing towards an outlet end which is in fluid communication with the outlet port from the housing, the cartridge having a plurality of flexible vanes at the inlet end which, when the cartridge is located within the housing, are twisted so that gas flowing over the vanes has a circumferential flow imparted to it around the axis of the cartridge.

2. Apparatus as claimed in claim 1, in which the vanes contact the internal wall of the housing towards one end thereof when the housing is closed, causing the vanes to be deformed when the housing is closed so that they become helically twisted.

3. Apparatus as claimed in claim 2, in which the vanes are made from a material which is resiliently deformable so that, after deformation of the vanes so that they have a helically twisted shape, they exert a force as they try to recover towards their untwisted shape.

4. Apparatus as claimed in claim 1, in which the cartridge and the housing are arranged so that the cartridge has to be twisted relative to the housing when the inlet end of the cartridge is fitted into the housing.

5. Apparatus as claimed in claim 1, in which the vanes are provided as a part of an end cap on the adsorbent material cartridge.

6. Apparatus as claimed in claim 1, in which the length of the cartridge measured between the points on the opposite ends at which it engages the internal end walls of the housing, prior to deformation of the vanes, is greater than the distance between the said engagement points on the end walls of the housing.

7. Apparatus as claimed in claim 1, in which the internal wall of the housing has a concave, generally rounded shape at the end which engages the inlet end of the cartridge.

8. Apparatus as claimed in claim 1, in which the axially separable parts of the housing having mating threads by which they can be connected to one another.

9. Apparatus as claimed in claim 1, in which the axially separable parts of the housing can be separated from one another towards the end of the housing in which the inlet port is provided.

10. Apparatus as claimed in claim 1, which includes openings between the vanes through which gas can enter the cartridge.

11. Apparatus as claimed in claim 10, which includes a seal between the outside of the cartridge and the internal wall of the housing, for minimizing flow of gas other than through the openings for gas to enter the cartridge.

* * * * *